UNITED STATES PATENT OFFICE.

SUMNER C. GRANGER, OF CHICAGO, ILLINOIS.

IMPROVEMENT IN PREPARING MASH FOR BREWING.

Specification forming part of Letters Patent No. 33,779, dated November 26, 1861.

*To all whom it may concern:*

Be it known that I, SUMNER C. GRANGER, of the city of Chicago and State of Illinois, have invented a new and Improved Method of Brewing Ale, Beer, and Porter; and I do hereby declare that the following is a full and exact description thereof.

The nature of my invention consists in a combination in certain proportions, in the usual mash-tub, of common malt, crushed raw Indian corn or Indian cornmeal, and what I call "carbonized zea major," to be hereinafter described, and water for brewing ale, beer, and porter.

To enable others skilled in the art to make and use my invention, I will proceed to describe the process and operation.

I first mix together in the mash-tub common malt, crushed raw Indian corn or Indian cornmeal, and pulverized or granulated carbonized zea major in the following proportions, or thereabout, namely: seventy-four per centum of common malt, twenty-five per centum of crushed raw Indian corn or Indian cornmeal, and one per centum of pulverized or granulated carbonized zea major, to which I add the necessary quantity of water for the brewing.

The article herein described as "carbonized zea major"—so called arbitrarily by me from the Latin, zea for corn, and major for great—is charcoal, and is intended to embrace charcoal made from corncobs (from whence it derives its name) and also from pine shavings, sawdust, or any other combustible substances charred in the usual way, or, as I produce it, in hermetically-sealed retorts. By subjecting the combination aforesaid in the mash-tub to the requisite degree and continuance of heat to complete the process of saccharification an improved article of worts is produced for use with hops in the usual manner of brewing, thereby producing a new and an improved article of ale, beer, and porter from the combination of malt and crushed raw Indian corn or Indian cornmeal in the combination aforesaid. The effect of the article carbonized zea major in the combination herein described is to absorb and retain the acids, oils, and other injurious and ill-flavored substances extracted from the crushed raw Indian corn or Indian cornmeal and from imperfectly malted or otherwise ill-flavored grains and held in solution in the water, (and liable without the use of this agent to remain in the worts,) and also a considerable proportion of the coloring-matter of the various grains by reason of its natural affinity for the substances aforesaid, and thus to produce from the combination of the crushed raw Indian corn or Indian cornmeal and common malt and water subjected to the requisite degree and continuance of heat and passed through the usual strainer an improved article of worts for brewing ale, beer, and porter.

The ale, beer, and porter made from the above-described improved worts, being purer, as well as paler and brighter, than that now made from common malt alone, will be longer and more easily kept sweet, and generally, in reference to the prices of corn and the commonly malted grains, the article may be produced at a cheaper rate.

What I claim as my invention, and desire to secure by Letters Patent, is—

The combination of common malt, crushed raw Indian corn or Indian cornmeal, and pulverized or granulated carbonized zea major, and water in the mash for brewing ale, beer, and porter, substantially and for the purposes as herein described.

SUMNER C. GRANGER.

Witnesses:
DANIEL GOODWIN, Jr.,
STEPHEN A. GOODWIN.